(12) United States Patent
Yamashita et al.

(10) Patent No.: US 11,568,213 B2
(45) Date of Patent: Jan. 31, 2023

(54) ANALYZING APPARATUS, ANALYSIS METHOD AND ANALYSIS PROGRAM

(71) Applicant: Hitachi, Ltd., Tokyo (JP)

(72) Inventors: Yasuho Yamashita, Tokyo (JP); Takuma Shibahara, Tokyo (JP); Mayumi Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 681 days.

(21) Appl. No.: 16/595,526

(22) Filed: Oct. 8, 2019

(65) Prior Publication Data

US 2020/0134430 A1    Apr. 30, 2020

(30) Foreign Application Priority Data

Oct. 29, 2018    (JP) .............................. JP2018-202952

(51) Int. Cl.
*G06N 3/04* (2006.01)
*G06N 7/00* (2006.01)
*G06K 9/62* (2022.01)

(52) U.S. Cl.
CPC ......... *G06N 3/0472* (2013.01); *G06K 9/6257* (2013.01); *G06N 7/005* (2013.01)

(58) Field of Classification Search
CPC ........ G06N 3/0472; G06N 7/005; G06N 3/08; G06K 9/6257; G06K 9/00536;
(Continued)

(56) References Cited

U.S. PATENT DOCUMENTS

2014/0335126 A1*  11/2014  Haynes ................. A61K 39/12
                                                                 530/389.4
2019/0065991 A1*   2/2019  Guggilla ................ G06N 20/00
(Continued)

FOREIGN PATENT DOCUMENTS

CN    106897545 A    6/2017
CN    108130372 A    6/2018

OTHER PUBLICATIONS

Su et al., "Long-term Blood Pressure Prediction with Deep Recurrent Neural Networks", 2018 IEEE EMBS International Conference on Biomedical & Health Informatics (BHI), Mar. 4-7, 2018 (Year: 2018).*

(Continued)

*Primary Examiner* — Qian Yang
(74) *Attorney, Agent, or Firm* — Mattingly & Malur, PC

(57) ABSTRACT

The analyzing apparatus: generates first internal data; converts a position of first feature data in a feature space, based on the first internal data and a second learning parameter; reallocates, based on a result of first conversion and the first feature data, the first feature data to a position obtained through the conversion in the feature space; calculates a predicted value of a hazard function of analysis time in a case where the first feature data is given, based on a result of reallocation and a third learning parameter; optimizes the first to third learning parameters, based on a response variable and a first predicted value; generates second internal data, based on second feature data and the optimized first learning parameter; converts a position of the second feature data in the feature space, based on the second internal data and the optimized second learning parameter; and calculates importance data.

11 Claims, 8 Drawing Sheets

(58) Field of Classification Search
CPC .............. G06K 9/6265; G06K 9/6277; G06K 9/6287; G06V 10/82
See application file for complete search history.

(56) References Cited

U.S. PATENT DOCUMENTS

2019/0244094 A1* 8/2019 Ramsl ................. G06F 9/453
2019/0316209 A1* 10/2019 Hubbell .............. C12Q 1/6806

OTHER PUBLICATIONS

Che et al., "Interpretable Deep Models for ICU Outcome Prediction", AMIA annual symposium proceedings, vol. 2016, pp. 371-380 (Year: 2016).*

Lee et al., "DeepHit: A Deep Learning Approach to Survival Analysis with Competing Risks", The Thirty-Second AAAI Conference on Artificial Intelligence (AAAI-18), Published Apr. 26, 2018 (Year: 2018).*

Changhee Lee, et al., "DeepHit: A Deep Learning Approach to Survival Analysis with Competing Risks", The Thirty-Second AAAI Conference on Artificial Intelligence (AAAI-18), 2018, pp. 2314-2321.

Marco Tulio Ribeiro, et al., "Why Should I Trust You?: Explaining the Predictions of Any Classifier", Proceedings of the 22nd ACM SIGKDD International Conference on Knowledge Discovery and Data Mining. ACM, 2016.

Trevor Hastie, et al., "The Elements of Statistical Learning", Second edition. New York: Springer series in statistics, 2001.

* cited by examiner

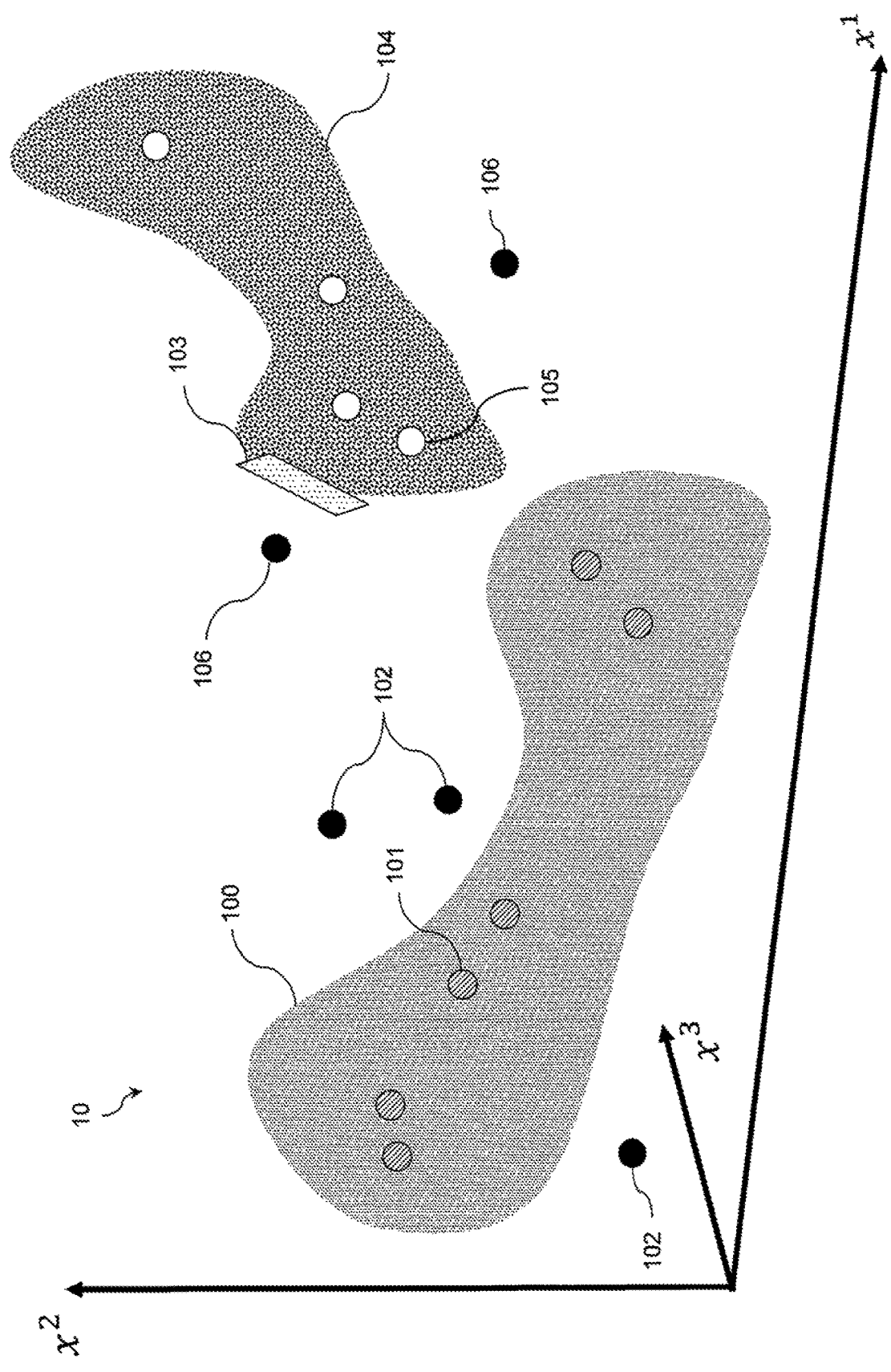

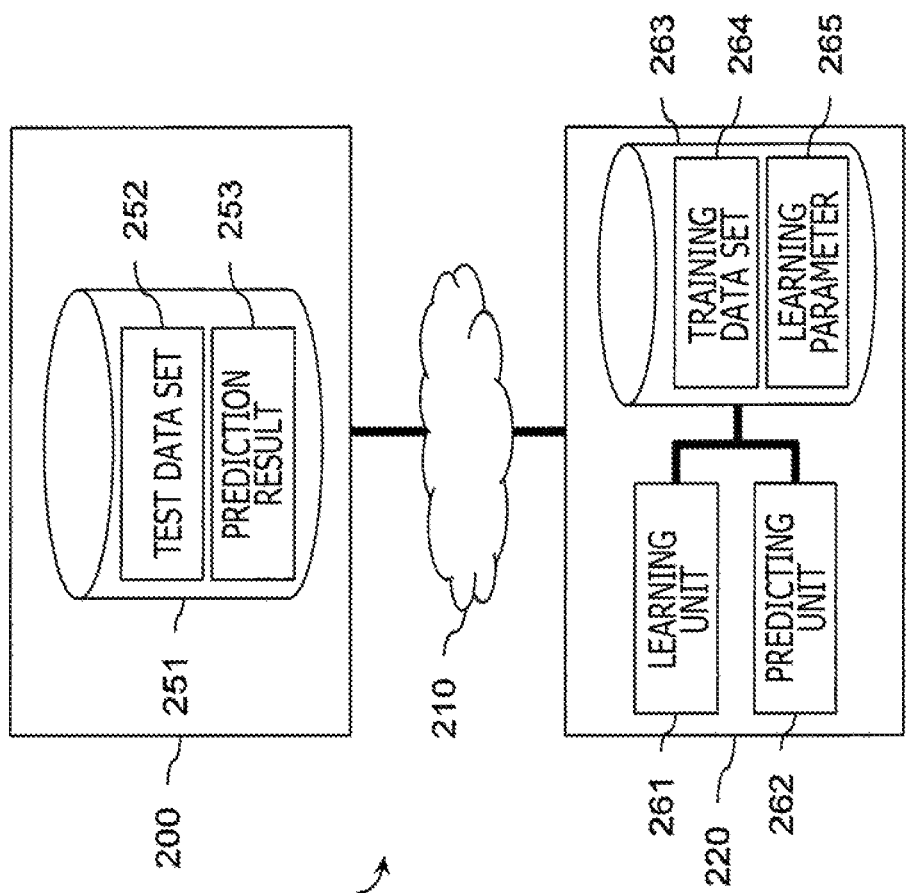
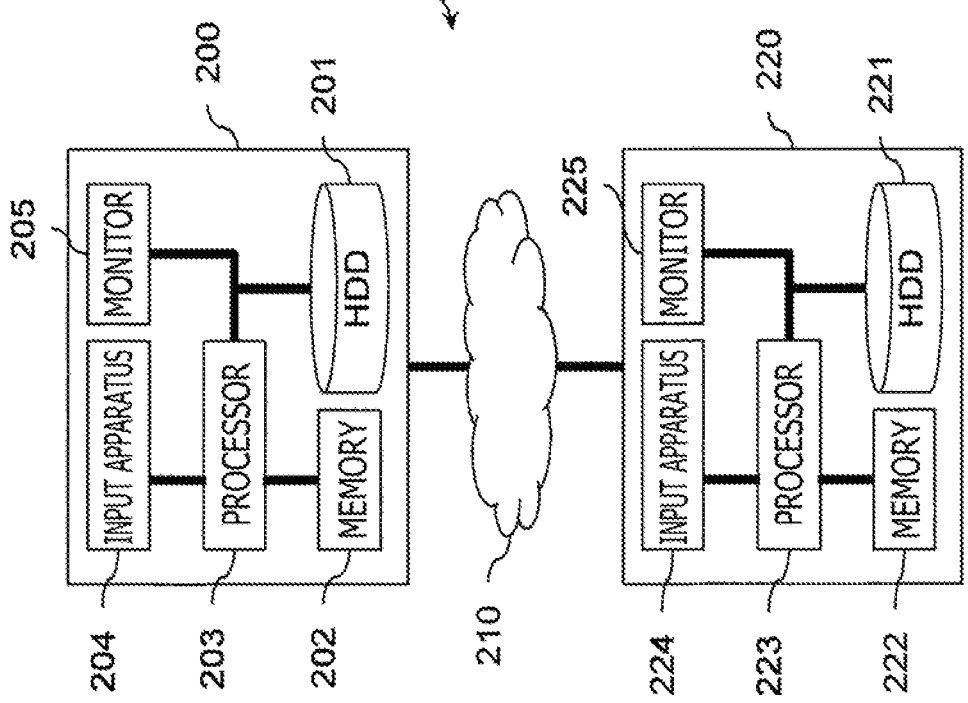

ANALYZING APPARATUS, ANALYSIS METHOD AND ANALYSIS PROGRAM

CLAIM OF PRIORITY

The present application claims priority from Japanese patent application JP2018-202952 filed on Oct. 29, 2018, the content of which is hereby incorporated by reference into this application.

BACKGROUND OF THE INVENTION

1. Field of the Invention

The present invention relates to an analyzing apparatus, an analysis method, and an analysis program used for analyzing data.

2. Description of the Related Art

Machine learning is one of technologies to realize artificial intelligence (AI). In machine learning, calculation of learning parameters such as weight vectors in the perceptron, and the like, so as to minimize errors between predicted values obtained from feature vectors and actual values, or true values, is called learning. Upon completion of learning processes, new predicted values are calculated from data not used for the learning, hereinafter, called test data. In the perceptron, the magnitude of each element value of a weight vector is used as the importance of a factor that contributed to prediction.

Neural network including deep learning can realize high prediction accuracy. On the other hand, each element of a feature vector undergoes weighted product-sum operation with other elements every time they pass through a plurality of perceptrons. Accordingly, it is difficult in principle to know the importance of each element singly. This becomes a fatal drawback if deep learning is used in real businesses.

In the example explained here, it is assumed that when a clinical trial is conducted for a certain drug, the pharmaceutical company uses AI in determining whether or not the drug is effective for a certain patient group based on results of the clinical trial. AI that uses deep learning cannot output factors that led to a prediction that "the certain drug is effective" for the certain patient group, along with such a prediction result. If AI can output also factors that led to its determinations, pharmaceutical companies can conduct appropriate clinical trials by more efficiently identifying patient groups who should be administered drugs.

One of indices that indicate effectiveness of a drug in a clinical trial includes lengths of time, or survival time, from the start of the clinical trial to ends of the clinical trial due to deaths of patients or censoring of the clinical trial. There is a concept, in prediction of survival time, of censoring which is not considered in neural network models normally used. When the clinical trial ends for individual patients, the causes are classified into a case where patients died, and a case where the clinical trial is censored for a reason such as discontinuation of administration or termination of the period of the clinical trial according to the determinations by the doctor.

These two cases provide data having attributes that are medically quietly different from each other in implication: patients are dead or alive at ends of a clinical trial. If analysis is performed without taking censoring into consideration, that is, with the assumption that all the patients died at the end of a clinical trial, there may be a significant difference between results to be occurred in reality and prediction results.

The concept of censoring is seen not only in clinical trials, but in prediction of time at which malfunctions of artificial objects such as machines, cancellation of various types of service or the like occur. For example, malfunctions of artificial objects include discontinuation of use, replacements of machines or the like due to the ends of warrantee periods, and cancellation of various types of service include discontinuation of contracts due to the ends of services. If factors that lead to malfunctions or cancellation can be output also in prediction of time at which malfunctions or cancellation occurs, hereinafter, such concepts similar to survival time like these are all called survival time, it is possible to prevent malfunctions of machines or to provide market services appropriately.

The most important amount in prediction of survival time including censoring is the function of feature amounts called a hazard function. The hazard function is defined about each time point, and the hazard function at the time T represents the probability of death, malfunction, or cancellation at the time T. The integration of the hazard function up to the time T, or cumulative hazard function, gives the probability of death until the time T, and the point at which the cumulative hazard function exceeds a threshold is considered as the time point at which death occurred. In addition, if the cumulative hazard function does not exceed a threshold at any point of time, the patient is deemed to be alive or censored. Accordingly, prediction of hazard functions is equivalent to prediction of survival time, and prevailing analysis models used in the prediction of survival time are the ones that treat hazard functions, which are easy to interpret, as targets of prediction.

The CN-108130372-A discloses a technique of creating a prediction model of a hazard function for acute myelogenous leukemia patients, and performing analysis of factors that contribute to the prediction. The technique disclosed in CN-108130372-A adopts not a non-linear technique such as deep learning not having the functionality of calculating importance but a linear model taking into consideration censoring called the Cox proportional hazard model in consideration of censoring, and additionally in order to enable output of determination factors.

The CN-106897545-A and "Lee, Changhee, et al. "Deephit: A deep learning approach to survival analysis with competing risks." AAAI, 2018," which is hereinafter referred to as Non-Patent Document 1, disclose techniques of creating nonlinear models to predict hazard functions while taking censoring into consideration. These techniques are not aimed at outputting predictors, but adopt deep learning techniques not having the functionality of outputting predictors. The technique disclosed in CN-106897545-A uses a unique network called Deep Belief Network, and the technique disclosed in Non-Patent Document 1 uses a unique network called DeepHit.

The "Ribeiro, Marco Tulio, Sameer Singh, and Carlos Guestrin. "Why should I trust you?: Explaining the predictions of any classifier." Proceedings of the 22nd ACM SIGKDD International Conference on Knowledge Discovery and Data Mining. ACM, 2016," which is hereinafter referred to as Non-Patent Document 2, discloses a technique of enabling newly learning linear regression or logistic regression in which technique decision results by machine learning techniques such as deep learning which does not have the functionality of calculating the importance of feature amounts can be explained. In addition, logistic regression is a machine learning model equivalent to perceptron, and is used most widely in any field. For example, the logistic regression illustrated in page 119 of "Friedman J, Trevor H, Robert T. The elements of statistical learning. second edition. New York: Springer series in statistics, 2001," which is hereinafter referred to as Non-Patent Document 3, has the functionality of calculating the importance of feature amounts about entire data samples.

SUMMARY OF THE INVENTION

The technique of CN-108130372-A assumes that input data is linearly independent of a response variable since the technique uses a linear model. This assumption does not hold true typically, and the model itself is not appropriate for issues where there is not linear independence. Accordingly, factors output from the model also can never be correct.

The techniques of CN-106897545-A and Non-Patent Document 1 can be applied to general issues where there is not linear independence mentioned above since the technique uses nonlinear models. However, deep learning models like Deep Believe Network and DeepHit cannot output factors that contribute to results of predictions made by the models.

The technique of Non-Patent Document 2 does not present a method to be applied to input data including censored data. Furthermore, the technique of Non-Patent Document 2 is merely attempting to give explanation using linear regression in retrospect, and even when it attempts to give explanation of normal fully-connected deep learning, it is not guaranteed mathematically that the importance of feature amounts that deep learning utilizes for prediction can be completely calculated. If linear regression can achieve prediction accuracy which is completely the same as the accuracy that can be achieved with deep learning, the deep learning itself is first of all unnecessary. The technique of Non-Patent Document 2 is contradictory in terms of configuration concept.

The present invention has been made in view of the circumstance explained above, and an object thereof is to realize facilitation of explanation of features of prediction targets for which continuity of analysis is considered.

An analyzing apparatus disclosed in the present application is accessible to a database and includes a processor that executes a program and a storage device that stores the program. The database stores a training data set including pieces of training data by an amount equal to the number of learning targets, and each piece of the training data includes: first feature data having a plurality of feature amounts of a learning target; a response variable indicating analysis time from a start of analysis to an end of the analysis about the learning target; and a variable indicating continuity of the analysis within the analysis time. Furthermore, the processor executes: a first generation process of generating first internal data on a basis of the first feature data and a first learning parameter; a first conversion process of converting a position of the first feature data in a feature space on a basis of the first internal data generated in the first generation process and a second learning parameter; a reallocation process of, based on a result of first conversion in the first conversion process and the first feature data, reallocating the first feature data to a position obtained through the conversion in the feature space; a first calculation process of calculating a first predicted value of a hazard function about the analysis time in a case where the first feature data is given, based on a result of reallocation in the reallocation process and a third learning parameter; an optimization process of optimizing the first learning parameter, the second learning parameter and the third learning parameter by a statistical gradient method on a basis of the response variable and the first predicted value calculated in the first calculation process; a second generation process of generating second internal data on a basis of second feature data including a plurality of feature amounts of a prediction target and the first learning parameter optimized in the optimization process; a second conversion process of converting a position of the second feature data in the feature space on a basis of second internal data generated in the second generation process and the second learning parameter optimized in the optimization process; and an importance calculation process of calculating importance data including an importance of each feature amount of the second feature data on a basis of a result of second conversion in the second conversion process and the third learning parameter optimized in the optimization process.

According to representative embodiments of the present invention, it is possible to realize facilitation of explanation of features of prediction targets for which continuity of analysis is considered. Problems, configurations and effects other than those mentioned above will be apparent from the following explanation of embodiments.

BRIEF DESCRIPTION OF THE DRAWINGS

FIG. 1 is an explanatory diagram illustrating the relationship between feature vector and classification boundary;

FIG. 2A is a block diagram illustrating a hardware configuration example of the analysis system;

FIG. 2B is a block diagram illustrating a functional configuration example of the analysis system;

DESCRIPTION OF THE PREFERRED EMBODIMENTS

First Embodiment

Figure 3:
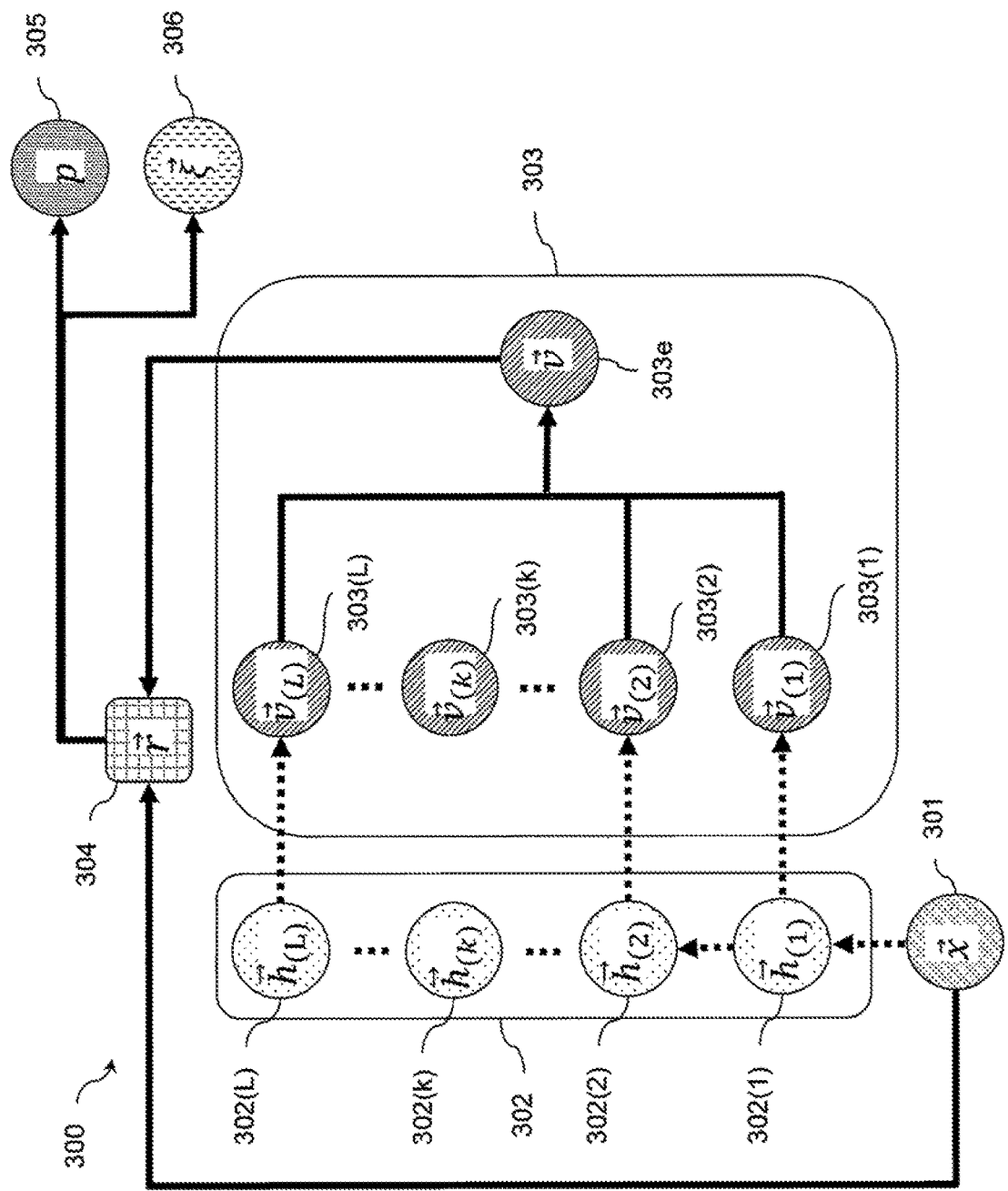
FIG. 3 is an explanatory diagram illustrating a structural example of a neural network according to a first embodiment.

The apparatus explained as an example in a first embodiment predicts a hazard function for three time classes of: zero month, or shorter than one month; one month, or equal to or longer than one month and shorter than two months; and two months, or equal to or longer than two months and shorter than three months, about colon cancer patients administered with an anti-cancer drug oxaliplatin, in a clinical trial of oxaliplatin, and also outputs factors contributing to the prediction. Factors output by an analyzing apparatus, based on the first embodiment, that analyzes data including censored data allow a pharmaceutical company who markets oxaliplatin to appropriately set the scope of application of oxaliplatin, and also give a good clue for clarifying the action mechanism of oxaliplatin. This contributes to the improvement in the quality of medical care, and also contributes significantly to the advancement of pharmaceutics and medical science.

<Spatiotemporal Feature Vector and Classification Surface>

FIG. 1 is an explanatory diagram illustrating the relationship between feature vector and classification boundary. FIG. 1 illustrates patients 101, 102, 105, and 106 in a feature space 10 over which dimensions representing features of patients, e.g., daily blood pressure, extend. A boundary surface 100 is a true classification boundary surface that separates the patients 101 who cannot survive for one month or longer and the patients 102 who can survive one month or longer. A boundary surface 104 is a true classification boundary surface that separates the patients 105 who cannot survive for two months or longer and the patients 106 who can survive two months or longer.

Although deep learning has the ability to calculate the boundary surfaces 100 and 104, the boundary surfaces 100 and 104 typically have too complicated curved surfaces for human abilities to understand. On the other hand, in some cases, even complicated curved surfaces like the boundary surfaces 100 and 104 can be seen as a plane 103 locally.

If the local plane 103 can be calculated for each patient by using innumerable perceptrons or logistic regression, a factor that contributed to prediction can be known as the magnitude of each element value of learning parameters, or the inclination of the local plane 103, of those linear models. An analyzing apparatus according to the first embodiment uses deep learning capable of processing data including censored data to generate a linear model for each patient.

System Configuration Example

FIGS. 2A and 2B are block diagrams illustrating a system configuration example of an analysis system. Although a server-client type analysis system 2 is explained as an example in FIGS. 2A and 2B, the analysis system may be a stand-alone type system. FIG. 2A is a block diagram illustrating a hardware configuration example of the analysis system 2, and FIG. 2B is a block diagram illustrating a functional configuration example of the analysis system 2. The same configurations are given the same signs in FIGS. 2A and 2B.

In the configuration of the analysis system 2, a client terminal 200, and an analyzing apparatus 220 which is a server are connected over a network 210 in a communicable manner. In FIG. 2A, the client terminal 200 has a hard disk drive (HDD) 201 which is an auxiliary storage apparatus, a memory 202 which is a main storage apparatus, a processor 203, an input apparatus 204 which is a keyboard or a mouse, and a monitor 205.

The analyzing apparatus 220 has an HDD 221 which is an auxiliary storage apparatus, a memory 222 which is a main storage apparatus, a processor 223, an input apparatus 224 which is a keyboard or a mouse, and a monitor 225. Note that the main storage apparatuses, the auxiliary storage apparatuses, and portable storage media, not illustrated, are collectively referred to as a storage device. The storage device stores a neural network 300, see FIG. 3, and learning parameters thereof.

In FIG. 2B, the client terminal 200 has a client database (DB) 251. The client DB251 is stored in the storage device such as the HDD 201 or the memory 202. The client DB251 stores a test data set 252, and a prediction result 253. The test data set 252 is a set of test data. The prediction result 253 is data obtained from the predicting unit 262 through the network 210. Note that in the case of a server-client type system, there exist one or more client terminals 200.

The analyzing apparatus 220 has a learning unit 261, a predicting unit 262, and a server database (DB) 263. The learning unit 261 is a functional unit that outputs learning parameters 265 by using the neural network 300.

The predicting unit 262 is a functional unit that: constructs the neural network 300 by using the learning parameters 265; executes a prediction process when having received test data input to the neural network 300; and outputs the prediction result 253 to the client terminal 200. The learning unit 261 and predicting unit 262 realize their functionalities by causing programs stored in storage devices such as the HDD 221 and the memory 222 to be executed by the processor 223

The server DB 263 stores a training data set 264 and the learning parameters 265. The training data set 264 is a set of training data constituted by combinations $\{x_{(n)}, Y_{(n)}, e_{(n)}\}$ of feature vectors $x_{(n)}$, response variables $Y_{(n)}$ which are true values thereof, and binary variables $e_{(n)}$ representing whether data is censored data or non-censored data. $n=\{1, 2, \ldots, N\}$, and n is an index for specifying patient data, for example. In the first embodiment, N=30,000.

A feature vector $x_{(n)} \in R^D$, where $R^D$ is a D-dimensional real number and D is an integer equal to or larger than one, is a D-dimensional real value vector, and includes information about the age, gender, medication, test values and the like related to a patient of n-th patient data. However, in order to enhance the understandability of the first embodiment, the feature vector $x_{(n)}$ is explained as {age, gender, leukocyte count [million cells]/μl}, where D=3-dimensional, in the following manner. Note that the test data set 252 is a set of test data which is other feature vectors not used as feature vectors $x_{(n)}$. Those other feature vectors to be test data is denoted as feature vectors $x'_{(n)}$.

A response variable $Y_{(n)}$ indicates survival time mentioned above, that is, analysis time from the start of analysis to the end of analysis about a learning target. Specifically, for example, the response variable $Y_{(n)}$ is a time class indicating class value i that is any one of "0," "1" or "2," for n-th patient data. The response variable $Y_{(n)}$ is referred to as a time class $Y_{(n)}$ in some cases. Here, the magnitude relationship of class values i is set so as to correspond to the magnitude relationship of survival time on which the time classes i are based. In the first embodiment, the class value i=0, class value i=1, and class value i=2 which are response variables $Y_{(n)}$ indicate that the survival time is zero month, one month, and two months, respectively.

A binary variable $e_{(n)}$ indicates the continuity of analysis, a clinical trial in this example, within analysis time, the survival time in this example, from the start of analysis to the end of analysis, about the feature vector $x_{(n)}$ which is a learning target. Specifically, for example, the value of the binary variable $e_{(n)}$ is "0" if a patient of an n-th patient data n is a censored patient, and the value of the binary variable $e_{(n)}$ is "1" if the patient is a non-censored patient. Here, the "censored" patient is a patient who is alive at the end of the clinical trial, that is, after a lapse of the survival time. On the other hand, the "non-censored" patient is a patient who died resulting in the end of a clinical trial, before the end of the clinical trial, that is, at a time until which the survival time has elapsed after the start of the clinical trial.

For example, if the patient data n has the class value i=2, and the binary variable $e_{(n)}$=0, this means that the clinical trial is censored after two months, and the patient is alive at the end of the clinical trial. On the other hand, for example, if the patient data n has the class value i=2, and the binary variable $e_{(n)}=1$, this means that since the patient died two months after the start of the clinical trial before the end of the clinical trial, the clinical trial is cancelled after the death without censoring of the clinical trial while the patient is alive.

The learning parameters 265 are output data from the learning unit 261, and include learning parameters $\{W_h, W, w\}$ mentioned below. The neural network 300 in which the learning parameters 265 are set is referred to as a prediction model. At the time of learning, initial values of the learning parameters $\{W_h, W, w\}$ are determined randomly.

Note that the analyzing apparatus 220 may be constituted by a plurality of analyzing apparatuses. For example, there may be a plurality of analyzing apparatuses 220 for load balancing. In addition, the analyzing apparatus 220 may be constituted by a plurality of analyzing apparatuses, each analyzing apparatus being responsible for a certain functionality. For example, the analyzing apparatus 220 may be constituted by a first server including the learning unit 261 and server DB 263, and a second server including the predicting unit 262 and server DB 263.

In addition, the analyzing apparatus 220 may be constituted by a first analyzing apparatus including the learning unit 261 and predicting unit 262, and a second analyzing apparatus including the server DB 263. In addition, the analyzing apparatus 220 may be constituted by a first server including the learning unit 261, a second analyzing apparatus including the predicting unit 262, and a third analyzing apparatus including the server DB 263.

Structural Example of Neural Network

FIG. 3 is an explanatory diagram illustrating a structural example of the neural network 300 according to the first embodiment. The neural network 300 is used in the learning unit 261 and predicting unit 262. The neural network 300 has a neuron group 302, a transform unit group 303, a reallocation unit 304, a decision unit 305, and an importance unit 306. In addition, the feature vector $x_{(n)}$ to be input data is illustrated as an input neuron 301.

The neuron group 302 is a set of neurons 302(1) to 302(L) of L layers and L is an integer equal to or larger than one. At the time of learning by the learning unit 261, a neuron 302(k), where k is an integer satisfying $1 \leq k \leq L$, receives output data from a neuron 302(k−1), which is an adjacent higher layer. Note that the neuron 302(1) receives an input of the feature vector $x_{(n)}$.

Then, the neuron 302(k) calculates an internal vector $h_{(k)}$ based on the feature vector $x_{(n)}$ and a learning parameter $W_{hk} \in R^{D \times D'}$, where D' is an integer equal to or larger than one, as illustrated in the following Formula (1). Note that the index n is omitted in order to facilitate explanation.

[Formula 1]

$$\vec{h}_{(k)} = \sigma(W_{hk}\vec{x}) \quad (1)$$

where $\vec{x}$ is the feature vector x.

In the above-mentioned Formula (1), the activation function σ is a sigmoid function, for example. In the operation of the neurons 302(1) to 302(L), the activation function σ may be a function such as tanh, softplus, or Relu. In the first embodiment, the type "Activation" and number of layers "Inner layers" of the activation function of the neuron group 302, and the number of dimensions D' "Number of neurons" of the internal vector $h_{(k)}$ can be set freely, see FIG. 5.

In this manner, the neuron 302(k) receives an output from the neuron 302(k−1) of the layer (k−1), which is an adjacent higher layer, executes the above-mentioned Formula (1), and outputs a result of the calculation to the layer (k+1), which is an adjacent lower layer. Note that the neuron 302(1) which is in the first layer receives the feature vector $x_{(n)}$, executes the above-mentioned Formula (1), and outputs a result of the calculation to the second layer, which is an adjacent lower layer.

In addition, at the time of prediction by the predicting unit 262 also, the neuron group 302 can execute the prediction similar to that executed at the time of learning, by using a learning parameter $W_h$ generated based on the above-mentioned Formula (1), the following Formula (5), and the following Formula (6). Note that, in the following explanation, each piece of information used at the time of prediction is given a single quotation mark "'" similar to a feature vector $x'_{(n)}$. At the time of prediction, the neuron 302(k) receives output data from the neuron 302(k−1), which is the adjacent higher layer. Note that the neuron 302(1) receives an input of the feature vector $x'_{(n)}$, which is the test data set 252.

The transform unit group 303 includes a set of L transform units 303(1) to 303(L). At the time of learning by the learning unit 261, the transform units 303(1) to 303(L) receives an input of the internal vector $h_{(k)}$ of the same layer, and uses the learning parameter $W_k \in R^{D \times D'}$ to calculate a transform vector $v_{(k)}^\alpha \in R^D$ for each layer by using the following Formula (2).

[Formula 2]

$$v_{(k)}^\alpha = W_{k\beta}^\alpha h^\beta \quad (2)$$

The above-mentioned Formula (2) uses the Einstein summation convention. For example, in $Z^\alpha = X^\alpha_{\ \beta} \cdot Y^\beta$, X is a matrix consisting of α rows and β columns, Y is a matrix consisting of β rows and one column, and Z is a matrix, or vector, consisting of α rows and one column. Hereinafter, the Einstein summation convention is used for formulae for explaining operation. In addition, α and β are omitted in some cases.

Each transform vector $v_{(k)}$ is input to a transform unit 303e downstream. The transform unit 303e averages transform vectors $v_{(k)}^\alpha$, and outputs a transform vector $V^\alpha$. The transform vector $V^\alpha$ is output to the reallocation unit 304 downstream.

In addition, at the time of prediction by the predicting unit 262 also, the transform unit group 303 receives an input of the internal vector $h'_{(k)}$ of the same layer, and uses the learning parameter $W_k$ to calculate a transform vector $v'_{(k)}^\alpha$ for each layer. The transform unit 303e averages transform vectors $v'_{(k)}^\alpha$, and outputs a transform vector $V'^\alpha$.

The reallocation unit 304 reallocates a feature vector group in its feature space. Specifically, for example, at the time of learning by the learning unit 261, the reallocation unit 304 receives an input of the feature vector $x_{(n)}$ and the averaged transform vector V, and calculates the reallocation vector $r^\alpha \in R^D$ by using the following Formula (3). The reallocation vector $r^\alpha$ is output to the decision unit 305 and importance unit 306 downstream.

[Formula 3]

$$r^\alpha = V^\alpha \odot x^\alpha \quad (3)$$

The operator ⊙ is the Hadamard product.

In addition, at the time of prediction by the predicting unit 262 also, the reallocation unit 304 receives an input of the feature vector $x'_{(n)}$ and the averaged transform vector V', and calculates the reallocation vector $r'^\alpha \in R^D$ by using the above-mentioned Formula (2), the above-mentioned Formula (3), and the learning parameter W generated based on the following Formula (5) and the following Formula (6).

At the time of learning by the learning unit 261, the decision unit 305 receives an input of the reallocation vector $r^\alpha$, and calculates a predicted value $p_{(n)}$ corresponding to a response variable $Y_{(n)}$ by using the following Formula (4).

[Formula 4]

$$p^i = \text{softmax}(w_\alpha{}^i r^\alpha) \quad (4)$$

The right-hand side, "softmax" is the softmax function, $w^i \in R^{D \times I}$ is the learning parameter of a class value i, here, I is the total number of class values i and I=3 in the present example, and $p^i$ is the probability of death at each class value i, that is, the predicted value of the hazard function. Note that i=0, 1, and 2.

In addition, the learning unit 261 uses a statistical gradient method, and receives an input of a combination of a response variable $Y_{(n)}$ and a binary variable $e_{(n)}$ representing whether data is censored data or non-censored data, and a probability value $p_{(n)}{}^i$ to calculate the learning parameters 265, $\{W_h, W, w\}$, so as to minimize the DeepHit loss function, see Non-Patent Document 1, illustrated in the following Formula (5) and the following Formula (6).

[Formula 5]

$$\operatorname{argmin}_{\{W_h, W, w\}} \quad (5)$$

$$\left\{ \sum_n \begin{array}{c} \overbrace{\left[\ldots \mathbb{1}(e_{(n)} \neq 0)\ln\left[p_{(n)}^{i=Y(n)}\right] - \mathbb{1}(\hat{e}_{(n)} = 0)\ln\left[1 - F_{(n)}^{i=Y(n)}\right]\right]}^{\text{first term}} \\ \underbrace{\ldots \alpha \sum_{n \neq m} \mathbb{1}(Y_{(n)} < Y_{(m)}) \exp\left(-\frac{F_{(n)}^{i=Y(n)} - F_{(m)}^{i=Y(n)}}{\sigma}\right)}_{\text{third term}} \end{array} \right\}$$

where $\mathbb{1}(A)$ is an indicator function that gives 1 if it satisfies the conditional expression represented by A, and gives 0 if not.

$$F_{(n)}{}^i = \sum_{j=0}^{i} p_{(n)}{}^j \quad (6)$$

The predicted value $F_{(n)}{}^i$ of the probability defined by the above-mentioned Formula (6) indicates the probability that a patient identified by patient data n dies before completion of the time class i of the patient data n. The first term in the above-mentioned Formula (5) maximizes the first probability value $p_{(n)}{}^{i=Y(n)}$ for the patient data n of a patient who is dead as indicated by the binary variable $e_{(n)} \neq 0$ indicating that censoring did not occur, i.e., death before censoring. The first probability value $p_{(n)}{}^{i=Y(n)}$ is the probability that a patient identified by patient data n dies at the time class i indicated by the response variable $Y_{(n)}$.

The second term maximizes the second probability value $1 - F_{(n)}{}^{i=Y(n)}$ for the patient data n of a patient who is censored as indicated by the binary variable $e_{(n)} = 0$. The second probability value $1 - F_{(n)}{}^{i=Y(n)}$ is the probability that a patient identified by the patient data n is not dead at the time of completion of survival time indicated by the time class $Y_{(n)}$.

The third term specifies the magnitude relationship of the time classes Y. When there is patient data n and m, where m≠n, having, as response variables, time classes $Y_{(n)}$ and $Y_{(m)}$ defined by the magnitude relationship $Y_{(n)} < Y_{(m)}$ of the time classes Y, if the predicting unit 262 knows a correctly reflecting magnitude relationship $Y_{(n)} < Y_{(m)}$, the predicted values $F_{(n)}{}^{i=Y(n)}$ and $F_{(m)}{}^{i=Y(n)}$ of the probability that patients of the patient data n and m die by the time class $Y_{(n)}$ should satisfy the magnitude relationship $F_{(n)}{}^{i=Y(n)} > F_{(m)}{}^{i=Y(n)}$ of the predicted values F.

However, if there is not the third term in the above-mentioned Formula (5), the analyzing apparatus 220 cannot set the magnitude relationship for the time classes Y. Because of this, the analyzing apparatus 220 does not necessarily satisfy the magnitude relationship $F_{(n)}{}^{i=Y(n)} > F_{(m)}{}^{i=Y(n)}$ of the predicted values F. In order to prevent this, all the combinations (n, m) of patient data not satisfying the magnitude relationship $F_{(n)}{}^{i=Y(n)} > F_{(m)}{}^{i=Y(n)}$ of the predicted values F are imposed a penalty by the third term such that the magnitude relationship $F_{(n)}{}^{i=Y(n)} > F_{(m)}{}^{i=Y(n)}$ of the predicted values F is satisfied.

The learning unit 261 stores, in the server DB 263, the learning parameters 265, $\{W_h, W, w\}$, generated based on the above-mentioned Formula (5), and the above-mentioned Formula (6).

The importance unit 306 gives the test data feature vector x'(n) to the neural network 300 in which the learning parameters 265, $\{W_h, W, w\}$, are reflected to calculate an importance vector $\xi$.

Specifically, for example, the importance unit 306 gives a transform vector V' based on the learning parameter w and the feature vector x'$_{(n)}$ that is the test data to the following Formula (7) to calculate an importance vector $\xi_\alpha{}^i(x') \in R^D$, here, i=0, 1, and 2.

[Formula 6]

$$\xi_\alpha{}^i(\vec{x}') = w_\alpha{}^i \odot V'_\alpha \quad (7)$$

The importance vector $\xi_\alpha{}^i(x')$ is a vector indicating the importance of the feature vector x' for each of the class values i=0, 1, and 2, and indicates how much the feature vector x'$_\alpha$ contributed to the prediction of the probability value $p^i$ classified into the class value i.

Also at the time of prediction by the predicting unit 262, the decision unit 305 uses the following Formula (8) to calculate the predicted value $p''_{(n)}$.

[Formula 7]

$$p'_{(n)}{}^i = \text{softmax}(\xi_\alpha{}^i(\vec{x}'_{(n)}) x'_{(n)}{}^\alpha) \quad (8)$$

In the above-mentioned Formula (8), the importance vector $\xi_\alpha{}^i(x'_{(n)})$ on the right-hand side corresponds to a local plane parameter for classifying the test data feature vector x'$_{(n)}$ as being in the time class of the class value i. For example, when i=1, and the test data feature vector x'$_{(n)}$ indicates a patient 105, the importance vector $\xi_\alpha{}^i(x'_{(n)})$ corresponds to the parameter of the local plane 103.

Example of Learning and Prediction Process Procedure

Figure 4:
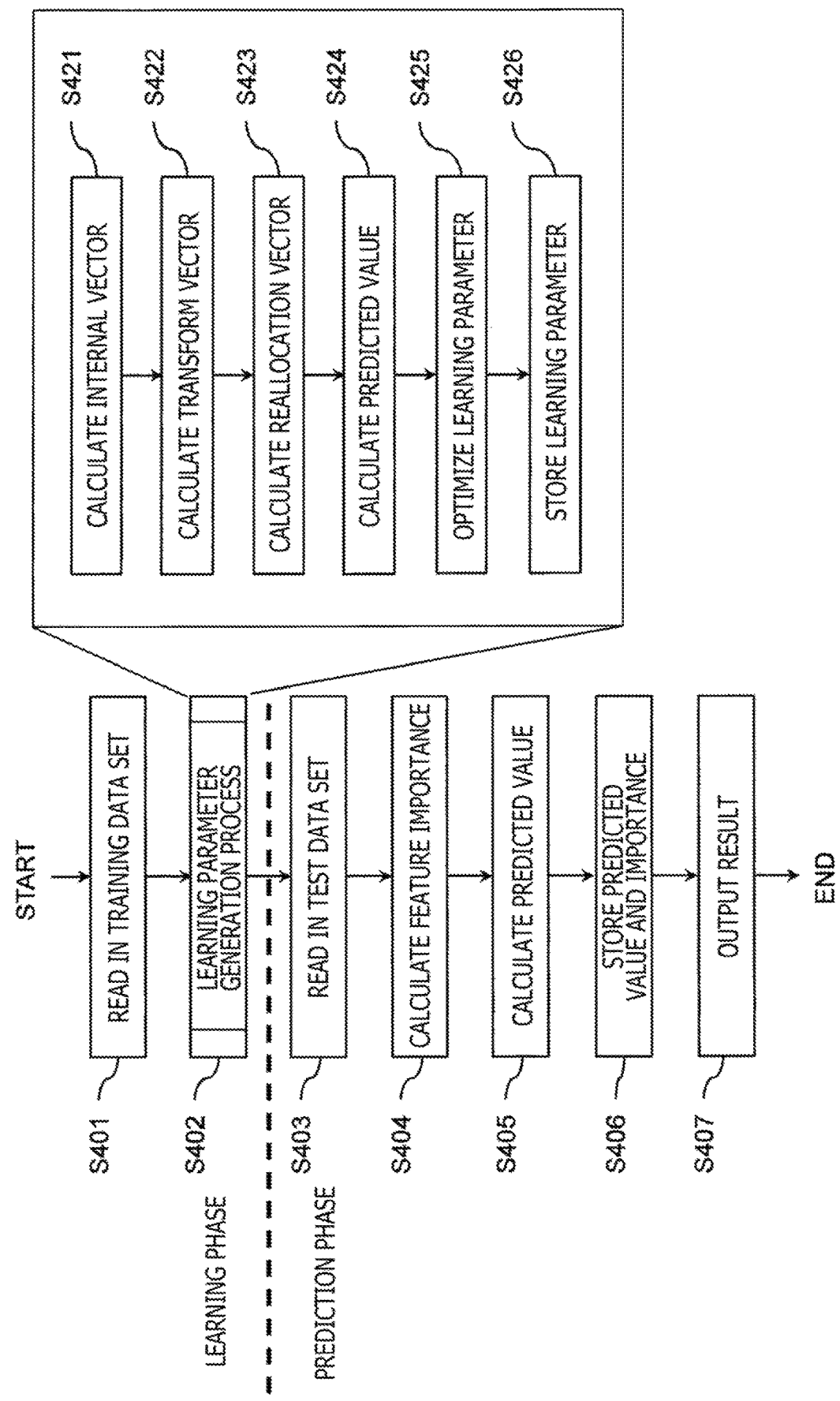
FIG. 4 is a flowchart illustrating an example of a learning and prediction process procedure performed by an analyzing apparatus.

FIG. 4 is a flowchart illustrating an example of a learning and prediction process procedure performed by an analyzing apparatus. Steps S401 and S402 correspond to the phase of learning executed by the learning unit 261, and Steps S403 to S407 correspond to the phase of prediction executed by the predicting unit 262. First, the learning unit 261 reads out the training data set 264 from the server DB 263 in Step S401, and executes a learning parameter generation process in Step S402.

In the learning parameter generation process in Step S402, as mentioned above, the learning unit 261 gives, to the neural network 300, the feature vector x$_{(n)}$ which is part of the training data set 264 to thereby calculate the internal vector $h_{(k)}$ based on the above-mentioned Formula (1) in Step S421.

Next, the learning unit 261 calculates a transform vector $v^{\alpha}{}_{(k)}$ for each layer k based on the above-mentioned Formula (2), and calculates in Step S422 the transform vector $V^{\alpha}$ by averaging them. Next, the learning unit 261 calculates the reallocation vector $r^{\alpha}$ based on the above-mentioned Formula (3) in Step S423. Next, in Step S424, the learning unit 261 calculates, for each class value i, the probability of death about the time class i, that is, the predicted value $p^i$ of a hazard function, based on the above-mentioned Formula (4).

Then, the learning unit 261 gives, to the above-mentioned Formula (5) and the above-mentioned Formula (6), the predicted value $p_{(n)}{}^i$ calculated based on the above-mentioned Formula (4) and the response variable $Y_{(n)}$ which is part of the training data set 264 to thereby optimize the learning parameters 265, {$W_h$, W, w}, in Step S425. Thereby, the optimized learning parameters 265, {$W_h$, W, w}, are generated. Then, the learning unit 261 stores the generated learning parameters 265, {$W_h$, W, w}, in the server DB 263, in Step S426.

Next, the predicting unit 262 reads out, from the client DB251, the feature vector $x'_{(n)}$, which is the test data set 252, in Step S403. Next, the predicting unit 262 calculates the importance of the feature amount in Step S404. Specifically, for example, by using the neuron group 302, the predicting unit 262 gives, to the above-mentioned Formula (1), the feature vector $x'_{(n)}$ and the optimized learning parameter $W_h$ to generate the internal vector $h'_{(k)}$.

By using the transform unit 303, the predicting unit 262 gives, to the above-mentioned Formula (2), the internal vector $h'_{(k)}$ and the optimized learning parameter $W_k$ to generate the transform vector $v'_{(k)}$, and averages the generated transform vectors $v'_{(1)}$ to $v'_{(L)}$ to generate the transform vector $V'_{\alpha}$. Then, by using the importance unit 306, the predicting unit 262 gives, to the above-mentioned Formula (7), the optimized learning parameter $w_{\alpha}{}^i$ and the transform vector $V'_{\alpha}$ to calculate the importance vector $\xi_{\alpha}{}^i(x'_{(n)})$ of the feature vector x'.

Next, by using the decision unit 305, the predicting unit 262 gives, to the above-mentioned Formula (8), the feature vector $x'_{(n)}$ and the importance vector $\xi_{\alpha}{}^i(x'_{(n)})$ determined based on the above-mentioned Formula (8) to calculate the predicted value $p''_{(n)}$ of the hazard function for each class value i, in Step S405.

Then, the predicting unit 262 stores, in the client DB251 and as a prediction result 253, a combination of the calculated predicted value $p''_{(n)}$ of the hazard function and the importance vector $\xi_{\alpha}{}^i(x'_{(n)})$ in Step S406. Thereafter, the client terminal 200 displays the prediction result 253 on the monitor 225 in Step S407.

In this manner, according to the first embodiment, the importance of each feature amount can be calculated for each patient even if censored data is included. Thereby, the analyzing apparatus 220 in the first embodiment can highly accurately and efficiently realize facilitation of explanation of the predicted value $p''_{(n)}$.

Note that, at Step S406, the analyzing apparatus 220 may store the prediction result 253 in the server DB 263. In addition, at Step S407, the analyzing apparatus 220 may transmit the prediction result 253 to the client terminal 200 to allow the client terminal 200 to display the prediction result 253 on the monitor 225.

Neural Network Setting Screen Example

Figure 5:
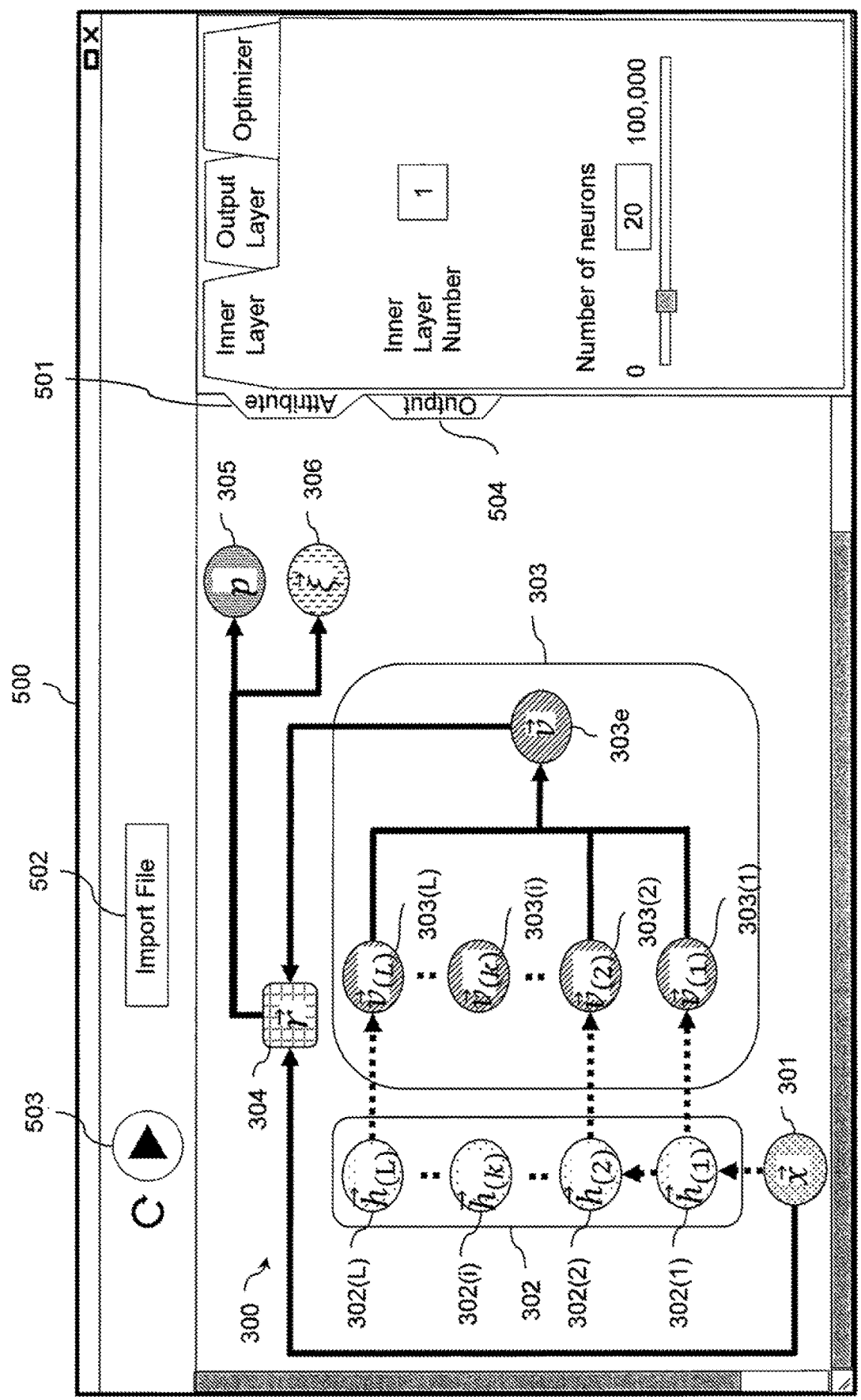
FIG. 5 is an explanatory diagram illustrating a neural network setting screen example.

FIG. 5 is an explanatory diagram illustrating a neural network setting screen example. A neural network setting screen 500 can be displayed on the monitors 205 and 225. If the setting screen 500 is displayed on the monitor 205, a neural network can be set in the client terminal 200, and if the setting screen 500 is displayed on the monitor 225, a neural network can be set in the analyzing apparatus 220.

A user edits detailed settings of a neural network on an attribute panel 501. "Inner Layer Number" on the attribute panel 501 corresponds to the number of layers L of the neuron group 302. In the illustrated neural network 300, the number of layers of the neuron group 302 is L.

Also, "Number of neurons" on the attribute panel 501 corresponds to the number of dimensions D' the internal vector $h_{(k)}$.

A user presses a file insertion button 502 to thereby select an analysis target file from a list of files. Thereby, the training data set 264 is set in the server DB 263, and the test data set 252 is set in the client DB251. A user presses an operation start button 503 to thereby execute the learning process, and prediction process illustrated in FIG. 4. An output panel 504 displays the prediction result 253 of the prediction process illustrated in FIG. 4.

Display Example of Output Panel 504

Figure 6:
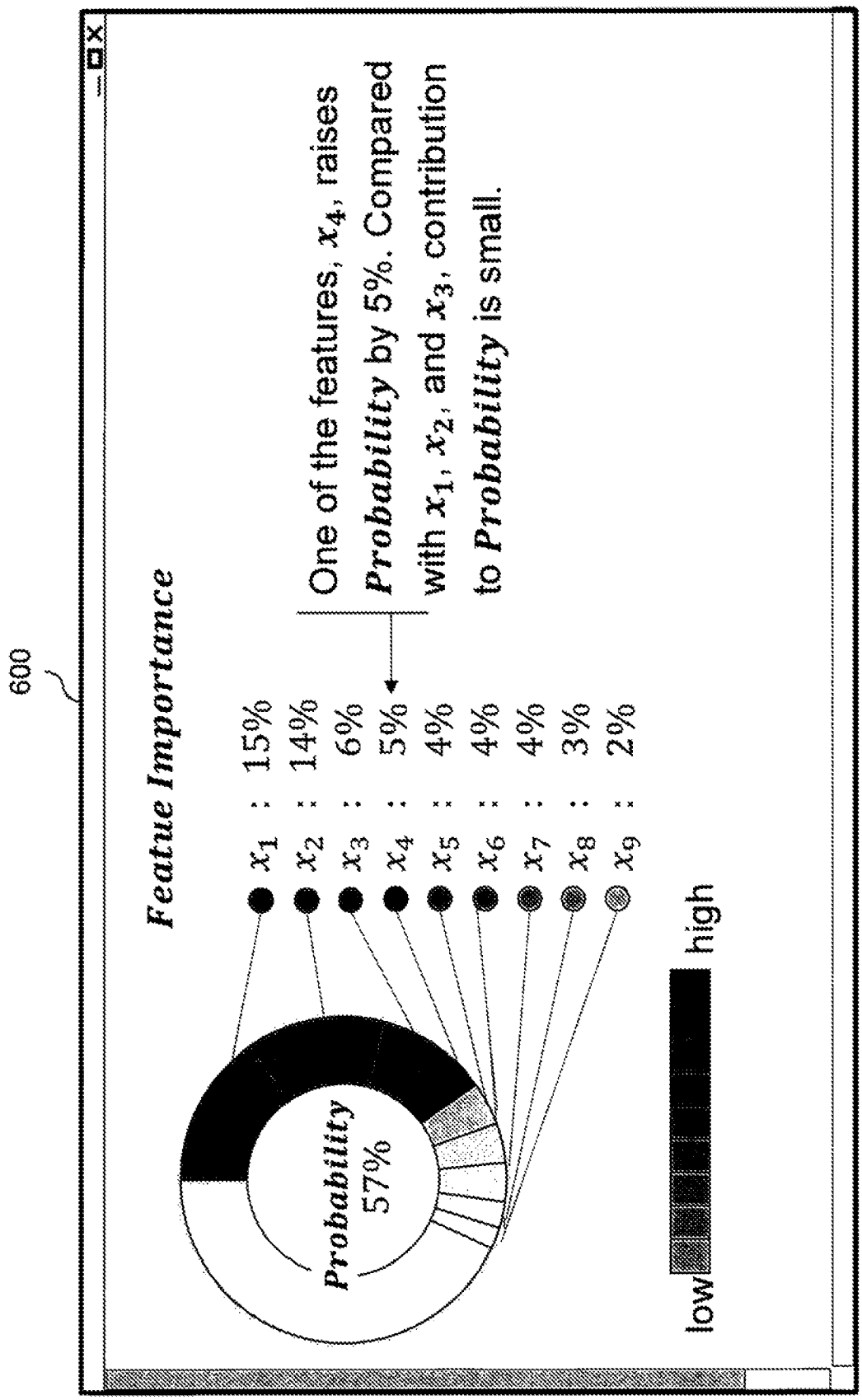
FIG. 6 is an explanatory diagram illustrating a display example of an output panel.

FIG. 6 is an explanatory diagram illustrating a display example of the output panel 504. The display screen 600 displays the prediction result 253 on the output panel 504. In FIG. 6, "Probability" "57%" is the predicted value $p'i_{(n)}$. $x_1$ to $x_9$ are D=9-dimensional feature amounts constituting the feature vector $x'_{(n)}$, which is the test data set 252. The percentages of the feature amounts $x_1$ to $x_9$ are numerical values representing the values of the importance vector $\xi_{\alpha}{}^i(x'_{(n)})$ as normalized percentage values Note that if there is a plurality of analysis targets that can be analyzed using the same feature vector $x_{(n)}$ in the neural network 300 illustrated in FIG. 3, the neuron group 302 may be branched at an intermediate middle layer k. The neuron group from the neuron 302(1) in the first layer to the neuron 302(k) in the middle layer k is referred to as the first neuron group. In addition, the neuron group from the neuron 302(k+1) in the layer (k+1), which is one layer lower than the middle layer k, to the neuron 302(L) of the lowermost layer L is referred to as latter neuron group. The number of branches in the latter neuron group is equal to the number of analysis targets. Similarly, the numbers of response variables $Y_{(n)}$, and binary variables $e_{(n)}$ are also equal to the number of analysis targets. However, the number of the feature vector $x_{(n)}$ is independent of the number of analysis targets, and is one.

For example, the neural network 300 including branches can predict survival time according to multiple types of factor in death, or feature amounts, related to cancer-related deaths as analysis targets corresponding to one of the destinations of the branch, and can predict survival time according to multiple types of factor in death, or feature amounts, related to non-cancer-related deaths as analysis targets corresponding to the other of the destinations of the branch.

Figure 7:
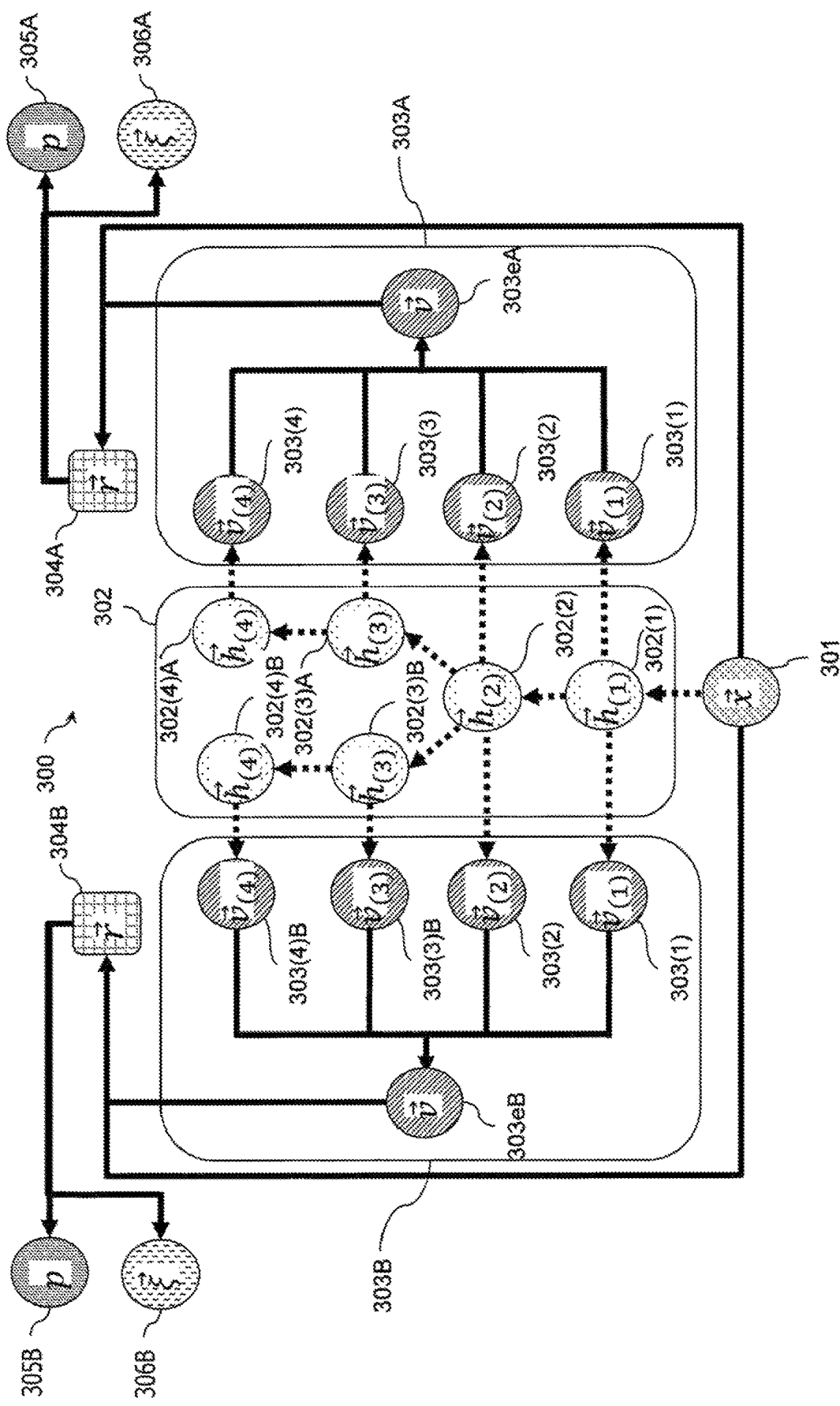
FIG. 7 is an explanatory diagram illustrating another structural example of a neural network.

FIG. 7 is an explanatory diagram illustrating another structural example of the neural network 300. In one example explained with reference to FIG. 7, the number of layers L=4. The neuron group 302 is branched at the layer k=2. A is given at the ends of signs of constituent elements related to one of the destinations of the branch, and B is given at the ends of signs of constituent elements related to the other of the destinations of the branch. Neurons with signs which are different only at theirs ends, A and B, have the same functions, but have learning parameters with different values.

For example, neurons 302(3)A and 302(3)B calculate the internal vector $h_{(3)}$ based on the above-mentioned Formula (1), but their learning parameters $W_{h3}$ are different with each other. Note that although each of neurons 302(1) and 302(2) before the branch is illustrated every destination of the branch for facilitation of explanation in FIG. 7, each of those neurons needs not be provided for every destination of the branch.

Since common ones can be used as the input neuron 301, the neurons 302(1) and 302(2), and transform units 303(1) and 303(2), learning and prediction corresponding to the number of branches can be performed by using one feature vector. Note that although the number of branches is two in FIG. 7, it may be equal to or larger than three.

Experiment Example

In addition, for example, the analyzing apparatus 220 in the first embodiment can predict survival time of breast cancer patients using, as feature vectors, the molecular taxonomy of breast cancer international consortium (METABRIC) data of breast cancer patients.

The METABRIC data is data set which is created for performing sub-group classification of breast cancer by the METABRIC, and consists of information indicating gene expression information, clinical features, survival time, and whether censored or not about 1,980 breast cancer patients. Among pieces of information in this gene expression information of the METABRIC data, only gene expression information obtained by using genetic markers MKI67, EGFR, PGR, and ERBB2 typically used for selecting treatment methods for breast cancer patients is used.

Factors identified by the importance output by the analyzing apparatus 220 based on the first embodiment allow doctors to give prognosis instructions appropriate for individual breast cancer patients. This contributes to the improvement in quality of medical care, and also leads to reduction in national medical expenditure and health expenditure.

Results of checking of the operation of the analyzing apparatus 220 by using the METABRIC data are explained. The METABRIC data consists of D=9-dimensional feature vectors $x_{(n)}$ of n=1, 980 samples. In addition, response variables $Y_{(n)}$ are set to amounts of survival time measured in the unit of month.

Figure 8:
FIG. 8 is a table illustrating experimental results.

FIG. 8 is a table illustrating experimental results. Specifically, for example, a table 800 in FIG. 8 illustrates experimental results obtained by performing comparison between a classifier based on the Cox proportional hazard model, a classifier based on DeepHit, see Non-Patent Document 3, and the analyzing apparatus 220 according to the first embodiment by using 10-fold cross validation on the scale of concordance index (C-index).

The C-index values are 0.63 for the Cox proportional hazard model, 0.64 for DeepHit, and 0.66 for the analyzing apparatus 220, Proposed, according to the first embodiment. The analyzing apparatus 220 according to the first embodiment achieved performance better than those of the conventional methods.

Note that although explanations were given about uses in the medical field in the first embodiment, uses of the analyzing apparatus 220 is not limited to the medical field, but for example the analyzing apparatus 220 can be applied to video distribution services. For example, customer features are used as feature vectors, and, for censored customer data, the binary variable e=0 indicates that a customer kept using a service without cancellation during the period of the class value i, and the binary variable e=1 indicates that a customer canceled the service during the period of the class value i. Thereby, based on the calculated importance, the operator of a video distribution service can know factors that are likely to lead to cancellation during contact periods, and can attempt to improve services.

Second Embodiment

A second embodiment illustrates an example in which the Cox regression model is applied to the analyzing apparatus 220. For example, the analyzing apparatus 220 explained as an example predicts a hazard function of a press machine at a factory, and also outputs factors that contribute to the prediction.

Predicted values output by the analyzing apparatus 220 according to the second embodiment make it possible to take preventive measures such as maintenance before a malfunction of the press machine occurs, and make it possible to prevent costs required for replacement of the press machine, and losses due to a stop of the operation of the press machine during the replacement. Furthermore, factors identified by the importance output by the analyzing apparatus 220 according to the second embodiment make it possible to take preventive measures before malfunctions efficiently and properly. This enables reduction in asset maintenance costs in the manufacturing industry, and efficient operation of facilities, and contributes to performance improvement in the manufacturing industry.

Training data is sample data constituted by, for example, combinations $(x_{(n)}, T_{(n)}, e_{(n)})$ of feature vectors $x_{(n)}$, response variables $T_{(n)}$, and binary variables $e_{(n)}$ with values of 0 corresponding to censored samples, and 1 corresponding to non-censored samples. n={1, ..., N} are indices for specifying certain sample data.

A feature vector $x_{(n)} \in R^D$ is a D-dimensional real value vector, and includes specification information indicating materials, manufacture date and the like of a machine, and sensor information indicating voltage, vibration, temperature and the like. A response variable $T_{(n)}$ is survival time of a press machine.

The operation executed at the decision unit 305 is performed by using Formula (9) based on the Cox regression model, in place of the above-mentioned Formula (4).

[Formula 8]

$$h_{Cox} = \exp(w_\alpha r^\alpha) \qquad (9)$$

$w_\alpha \in R^D$ is a learning parameter, and $h_{cox}$ is a predicted value of a hazard function in the Cox regression model. In the operation executed at the decision unit 305, the exponential regression model, Weibull regression model, or logarithmic logistic regression model may be used instead of the Cox regression model represented by Formula (9).

In addition, in the operation executed at the learning unit 261, an approximation based on the Efron method of the Cox partial likelihood function represented by the following Formula (10) is executed in place of the above-mentioned formula (5).

[Formula 9]

$$\operatorname{argmin}_{\{W_h, W, w\}} \sum_n \left[ \sum_{j \in D(T_{(n)})} w_a^{(j)} r_{(j)}^a - \sum_{k=1}^{d_n} \ln \left[ \frac{\sum_{j \in R(T_{(n)})} \exp(w_a^{(j)} r_{(j)}^a) - \frac{k-1}{d_n}}{\sum_{j \in D(T_{(n)})} \exp(w_a^{(j)} r_{(j)}^a)} \right] \right] \quad (10)$$

Here, $d_n$ is the number of persons whose survival time is $T_{(n)}$, $D(T_{(n)})$ is a set of samples whose survival time is $T_{(n)}$, and $R(T_{(n)})$ is a set of samples whose survival time is equal to or longer than $(T_{(n)})$. In the operation performed at the learning unit 261, the Cox partial likelihood function formula based on the Breslow method or Exact method can be used instead of Formula (11). In addition, if any of the exponential regression model, Weibull regression model, and logarithmic logistic regression model is used in the operation executed at the decision unit 305, the logarithmic likelihood function of the model can be used.

Note that the present invention is not limited to the embodiments mentioned above, but include various variants and equivalent configurations within the gist of the attached Claims. For example, the embodiments mentioned above are explained in detail in order to explain the present invention in an easy-to-understand manner, and the present invention is not necessarily limited to those including all the explained configurations. In addition, some of configurations of an embodiment may be replaced with configurations of another embodiment. In addition, configurations of an embodiment may be added to configurations of another embodiment. In addition, some of configurations of each embodiment may be subjected to addition of other configuration, removal, or replacement with other configurations.

In addition, each configuration, functionality, processing unit, processing means or the like mentioned above may be realized by hardware by, for example, partially or entirely designing it with an integrated circuit, or may be realized by software by a processor interpreting and executing a program for realizing the functionality of it.

Information in a program, a table, a file or the like that realizes each functionality can be stored on a storage apparatus such as a memory, a hard disk or an solid state drive (SSD), or a recoding medium which is an integrated circuit (IC) card, an SD card or a digital versatile disc (DVD).

In addition, illustrated control lines or information line are those that are deemed to be necessary for explanation, and all control lines or information lines that are necessary for implementation are not necessarily illustrated. Actually, almost all the configurations may be deemed to be connected to each other.

What is claimed is:

1. An analyzing apparatus accessible to a database, the analyzing apparatus including a processor that executes a program and a storage device that stores the program, the database storing a training data set that includes pieces of training data by an amount equal to the number of learning targets, each piece of the training data including first feature data having a plurality of feature amounts of a learning target, a response variable indicating analysis time from a start of analysis to an end of the analysis about the learning target, and a variable indicating continuity of the analysis within the analysis time, the processor executing:
a first generation process of generating first internal data on a basis of the first feature data and a first learning parameter;
a first conversion process of converting a position of the first feature data in a feature space on a basis of the first internal data generated in the first generation process, and a second learning parameter;
a reallocation process of, based on a result of first conversion in the first conversion process and the first feature data, reallocating the first feature data to a position obtained through the conversion in the feature space;
a first calculation process of calculating a first predicted value of a hazard function about the analysis time in a case where the first feature data is given, based on a result of reallocation in the reallocation process and a third learning parameter;
an optimization process of optimizing the first learning parameter, the second learning parameter, and the third learning parameter by a statistical gradient method on a basis of the response variable and the first predicted value calculated in the first calculation process;
a second generation process of generating second internal data on a basis of second feature data including a plurality of feature amounts of a prediction target and the first learning parameter optimized in the optimization process;
a second conversion process of converting a position of the second feature data in the feature space on a basis of second internal data generated in the second generation process and the second learning parameter optimized in the optimization process; and
an importance calculation process of calculating importance data including an importance of each feature amount of the second feature data on a basis of a result of second conversion in the second conversion process and the third learning parameter optimized in the optimization process, wherein the processor executes the first generation process using a neuron group of a plurality of layers, each of the layers being allocated with the first learning parameter, wherein in the first generation process, the processor: uses neurons of a first layer among the neuron group to generate first internal data of the first layer on a basis of the first feature data and a first learning parameter of the first layer, and outputs the first internal data of the first layer to neurons of a second layer; and uses neurons of a middle layer to generate first internal data of the middle layer on a basis of first internal data output from neurons of an adjacent higher layer and a first learning parameter of the middle layer, and outputs the first internal data of the middle layer to neurons of an adjacent lower layer, wherein the database stores the response variables and the variables corresponding to the first feature data, by an amount equal to the number of analysis targets, wherein the neuron group is constituted by a first neuron group from the first layer to a particular middle layer, and a latter neuron group of an amount equal to the number of the analysis targets from an adjacent lower layer of the particular middle layer to a lowermost layer, wherein in the first conversion process, for each combination of the first neuron group and the latter neuron group, the processor converts the position of the first feature data in the feature space, based on first internal data output from each neuron in the combination, wherein in the reallocation process, for the combination, the processor reallocates the first feature data to a position obtained through the conversion in the feature space, wherein in the first calculation process, for the combination, the processor calculates the first predicted value, wherein in the optimization process, for the combination, the processor optimizes the first learning parameter, the second learning parameter, and the third learning parameter by a statistical gradient method, wherein in the second generation process, the processor uses neurons of the first layer to generate second internal data of the first layer on a basis of the second feature data and the first learning parameter of the first layer, the first learning parameter being optimized in the optimization process, and outputs the second internal data of the first layer to neurons of the second layer; and uses neurons of the middle layer to generate second internal data of the middle layer on a basis of second internal data output from neurons of an adjacent higher layer and a first learning parameter of the middle layer, and outputs the second internal data of the middle layer to neurons of an adjacent lower layer, wherein in the second conversion process, for the combination, the processor converts the position of the second feature data in the feature space, based on second internal data output from each neuron in the combination, and wherein in the importance calculation process, for the combination, the processor calculates the importance data.

2. The analyzing apparatus according to claim 1, wherein the processor executes a second calculation process of calculating a second predicted value of the hazard function about the analysis time in a case where the second feature data is given, based on the importance data calculated in the importance calculation process and the second feature data.

3. The analyzing apparatus according to claim 1, wherein the processor executes an output process of outputting the second feature data and the importance data in association with each other.

4. The analyzing apparatus according to claim 1, wherein
in the first calculation process, the processor calculates the first predicted value by classification operation, and
in the optimization process, a DeepHit loss function is used as a loss function used in determination of the first learning parameter, the second learning parameter, and the third learning parameter.

5. The analyzing apparatus according to claim 1, wherein
in the first calculation process, the processor calculates the first predicted value by regression operation, and
in the optimization process, a likelihood function is used as a loss function used in determination of the first learning parameter, the second learning parameter, and the third learning parameter.

6. The analyzing apparatus according to claim 5, wherein
the regression operation is a Cox regression operation, and
the likelihood function is a Cox partial likelihood function based on an Efron method, a Breslow method, or an Exact method.

7. The analyzing apparatus according to claim 5, wherein
the regression operation is exponential regression operation, and
the likelihood function is a logarithmic likelihood function of an exponential regression model.

8. The analyzing apparatus according to claim 5, wherein
the regression operation is Weibull regression operation, and
the likelihood function is a logarithmic likelihood function of a Weibull regression model.

9. The analyzing apparatus according to claim 5, wherein
the regression operation is logarithmic logistic regression operation, and
the likelihood function is a logarithmic likelihood function of a logarithmic logistic regression model.

10. An analysis method used by an analyzing apparatus that is accessible to a database and includes a processor that executes a program and a storage device that stores the program,
the database storing a training data set that includes pieces of training data by an amount equal to the number of learning targets, each piece of the training data including: first feature data having a plurality of feature amounts of a learning target, a response variable indicating analysis time from a start of analysis to an end of the analysis about the learning target, and a variable indicating continuity of the analysis within the analysis time, the analysis method comprising:
by the processor,
a first generation process of generating first internal data on a basis of the first feature data and a first learning parameter;
a first conversion process of converting a position of the first feature data in a feature space on a basis of the first internal data generated in the first generation process and a second learning parameter;
a reallocation process of, based on a result of first conversion in the first conversion process and the first feature data, reallocating the first feature data to a position obtained through the conversion in the feature space;
a first calculation process of calculating a first predicted value of a hazard function about the analysis time in a case where the first feature data is given, based on a result of reallocation in the reallocation process and a third learning parameter;
an optimization process of optimizing the first learning parameter, the second learning parameter, and the third learning parameter by a statistical gradient method on a basis of the response variable and the first predicted value calculated in the first calculation process;
a second generation process of generating second internal data on a basis of second feature data including a plurality of feature amounts of a prediction target and the first learning parameter optimized in the optimization process;
a second conversion process of converting a position of the second feature data in the feature space on a basis of second internal data generated in the second generation process and the second learning parameter optimized in the optimization process; and
an importance calculation process of calculating importance data including an importance of each feature amount of the second feature data on a basis of a result of second conversion in the second conversion process and the third learning parameter optimized in the optimization process, wherein the processor executes the first generation process using a neuron group of a plurality of layers, each of the layers being allocated with the first learning parameter, wherein in the first generation process, the processor: uses neurons of a first layer among the neuron group to generate first internal data of the first layer on a basis of the first feature data and a first learning parameter of the first layer, and outputs the first internal data of the first layer to neurons of a second layer; and uses neurons of a middle layer to generate first internal data of the middle layer on a basis of first internal data output from neurons of an adjacent higher layer and a first learning parameter of the middle layer, and outputs the first internal data of the middle layer to neurons of an adjacent lower layer, wherein the database stores the response variables and the variables corresponding to the first feature data, by an amount equal to the number of analysis targets, wherein the neuron group is constituted by a first neuron group from the first layer to a particular middle layer, and a latter neuron group of an amount equal to the number of the analysis targets from an adjacent lower layer of the particular middle layer to a lowermost layer, wherein in the first conversion process, for each combination of the first neuron group and the latter neuron group, the processor converts the position of the first feature data in the feature space, based on first internal data output from each neuron in the combination, wherein in the reallocation process, for the combination, the processor reallocates the first feature data to a position obtained through the conversion in the feature space, wherein in the first calculation process, for the combination, the processor calculates the first predicted value, wherein in the optimization process, for the combination, the processor optimizes the first learning parameter, the second learning parameter, and the third learning parameter by a statistical gradient method, wherein in the second generation process, the processor uses neurons of the first layer to generate second internal data of the first layer on a basis of the second feature data and the first learning parameter of the first layer, the first learning parameter being optimized in the optimization process, and outputs the second internal data of the first layer to neurons of the second layer; and uses neurons of the middle layer to generate second internal data of the middle layer on a basis of second internal data output from neurons of an adjacent higher layer and a first learning parameter of the middle layer, and outputs the second internal data of the middle layer to neurons of an adjacent lower layer, wherein in the second conversion process, for the combination, the processor converts the position of the second feature data in the feature space, based on second internal data output from each neuron in the combination, and wherein in the importance calculation process, for the combination, the processor calculates the importance data.

11. A non-transitory computer readable medium storing an analysis program to be executed by a processor accessible to a database, the database storing a training data set that includes pieces of training data by an amount equal to the number of learning targets, each piece of the training data including: first feature data having a plurality of feature amounts of a learning target, a response variable indicating analysis time from a start of analysis to an end of the analysis about the learning target, and a variable indicating continuity of the analysis within the analysis time, the analysis program, when executed by the processor, causes the processor to execute processes comprising:

a first generation process of generating first internal data on a basis of the first feature data and a first learning parameter;

a first conversion process of converting a position of the first feature data in a feature space on a basis of the first internal data generated in the first generation process and a second learning parameter;

a reallocation process of, based on a result of first conversion in the first conversion process and the first feature data, reallocating the first feature data to a position obtained through the conversion in the feature space;

a first calculation process of calculating a first predicted value of a hazard function about the analysis time in a case where the first feature data is given, based on a result of reallocation in the reallocation process and a third learning parameter;

an optimization process of optimizing the first learning parameter, the second learning parameter, and the third learning parameter by a statistical gradient method on a basis of the response variable and the first predicted value calculated in the first calculation process;

a second generation process of generating second internal data on a basis of second feature data including a plurality of feature amounts of a prediction target and the first learning parameter optimized in the optimization process;

a second conversion process of converting a position of the second feature data in the feature space on a basis of second internal data generated in the second generation process and the second learning parameter optimized in the optimization process; and an importance calculation process of calculating importance data including an importance of each feature amount of the second feature data on a basis of a result of second conversion in the second conversion process and the third learning parameter optimized in the optimization process, wherein the processor executes the first generation process using a neuron group of a plurality of layers, each of the layers being allocated with the first learning parameter, wherein in the first generation process, the processor: uses neurons of a first layer among the neuron group to generate first internal data of the first layer on a basis of the first feature data and a first learning parameter of the first layer, and outputs the first internal data of the first layer to neurons of a second layer; and uses neurons of a middle layer to generate first internal data of the middle layer on a basis of first internal data output from neurons of an adjacent higher layer and a first learning parameter of the middle layer, and outputs the first internal data of the middle layer to neurons of an adjacent lower layer, wherein the database stores the response variables and the variables corresponding to the first feature data, by an amount equal to the number of analysis targets, wherein the neuron group is constituted by a first neuron group from the first layer to a particular middle layer, and a latter neuron group of an amount equal to the number of the analysis targets from an adjacent lower layer of the particular middle layer to a lowermost layer, wherein in the first conversion process, for each combination of the first neuron group and the latter neuron group, the processor converts the position of the first feature data in the feature space, based on first internal data output from each neuron in the combination, wherein in the reallocation process, for the combination, the processor reallocates the first feature data to a position obtained through the conversion in the feature space, wherein in the first calculation process, for the combination, the processor calculates the first predicted value, wherein in the optimization process, for the combination, the processor optimizes the first learning parameter, the second learning parameter, and the third learning parameter by a statistical gradient method, wherein in the second generation process, the processor uses neurons of the first layer to generate second internal data of the first layer on a basis of the second feature data and the first learning parameter of the first layer, the first learning parameter being optimized in the optimization process, and outputs the second internal data of the first layer to neurons of the second layer; and uses neurons of the middle layer to generate second internal data of the middle layer on a basis of second internal data output from neurons of an adjacent higher layer and a first learning parameter of the middle layer, and outputs the second internal data of the middle layer to neurons of an adjacent lower layer, wherein in the second conversion process, for the combination, the processor converts the position of the second feature data in the feature space, based on second internal data output from each neuron in the combination, and wherein in the importance calculation process, for the combination, the processor calculates the importance data.

* * * * *